(No Model.)

L. B. PRAHAR & C. S. SHEPARD.
COMBINED BUTTONER AND CIGAR CUTTER.

No. 336,867. Patented Feb. 23, 1886.

WITNESSES:
Chas. Nida
C. Sedgwick

INVENTOR:
L. B. Prahar
C. S. Shepard
BY Munn & Co
ATTORNEYS.

UNITED STATES PATENT OFFICE.

LOUIS B. PRAHAR AND CHARLES S. SHEPARD, OF BROOKLYN, NEW YORK.

COMBINED BUTTONER AND CIGAR-CUTTER.

SPECIFICATION forming part of Letters Patent No. 336,867, dated February 23, 1886.

Application filed December 30, 1885. Serial No. 187,076. (No model.)

*To all whom it may concern:*

Be it known that we, LOUIS B. PRAHAR and CHARLES S. SHEPARD, both of Brooklyn, in the county of Kings and State of New York, have invented a new and useful Improvement in Combined Button-Hooks and Cigar-Cutters, of which the following is a full, clear, and exact description.

Reference is to be had to the accompanying drawings, forming a part of this specification, in which similar letters of reference indicate corresponding parts in all the figures.

Figure 1:
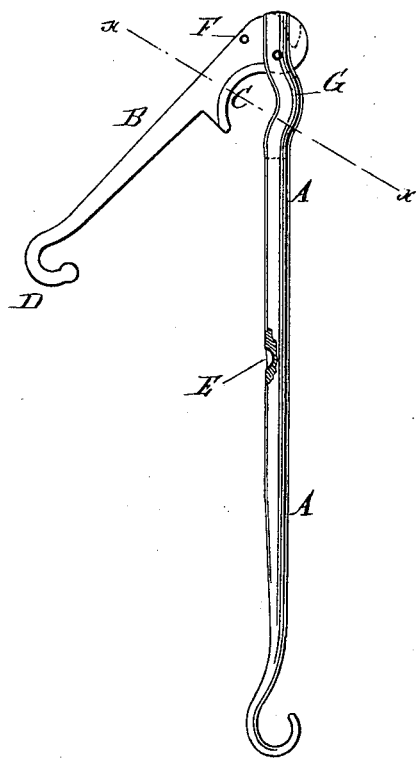
Figure 2:
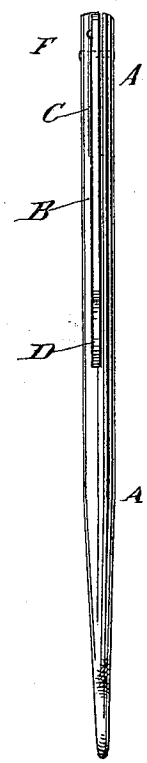
Figure 3:
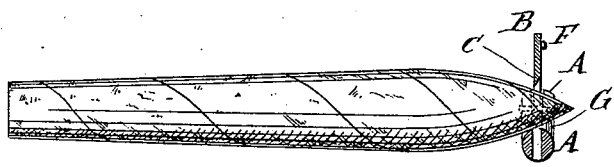

Figure 1 is a side elevation of one of our combined button-hooks and cigar-cutters shown open, part being broken away. Fig. 2 is an elevation of the same turned one-quarter around from position shown in Fig. 1, and shown closed. Fig. 3 is a sectional elevation of the same, taken through the line $x\ x$, Fig. 1, illustrating its use, the cigar being shown in side elevation.

The object of this invention is to provide an implement constructed in such a manner that it can be readily used for buttoning shoes or gloves, or for cutting off the ends of cigars, and which can be conveniently carried in the pocket.

The invention consists in the combination, with the slotted stem of a button-hook, of a hinged bar provided with a concaved cutter, as will be hereinafter fully described.

A represents the stem of a button-hook in which is formed a longitudinal slot. In the slot of the stem A is hinged the end of a bar, B. Upon the inner edge of the bar B is formed, or to it is attached, a cutter, C, having a concaved cutting-edge, as shown in Fig. 1, and which, when the bar B is closed against the stem A, shuts into the slot in the said stem.

Upon the free end of the hinged-bar B can be formed a hook, D, which may be used as a glove-hook, but which is especially designed to shut into a recess, E, in the stem A, and serve as a catch to keep the bar B in place when shut down against the said stem A. The rearward movement of the bar B upon its pivot can be limited by a projection, F, formed upon or a pin attached to its rear part, and which comes in contact with the rear side of the stem A.

If desired, a bend, G, can be formed in the stem A directly opposite the cutter C, for the end of the cigar to rest in while being cut, to prevent the cigar from being pushed forward upon the said stem when struck by the cutter C.

If desired, the rear end of the bar B can have a hook, point, or prong formed upon it, as indicated in dotted lines in Fig. 1, to adapt the implement to be used as a hat and coat holder, as described in the application upon which a patent was allowed December 18, 1885, Serial No. 183,205, Louis B. Prahar, inventor.

Having thus fully described our invention, we claim as new and desire to secure by Letters Patent—

The combination, with the slotted stem A of a button-hook, of a bar, B, hinged in the said slot and provided with a cutter, C, substantially as herein shown and described, whereby the implement can be used for cutting off the ends of cigars, as set forth.

LOUIS B. PRAHAR.
CHARLES S. SHEPARD.

Witnesses:
JAMES T. GRAHAM,
EDGAR TATE.